Nov. 28, 1933.  F. W. DAVIS  1,937,470
POWER STEERING MECHANISM
Filed Oct. 24, 1928  7 Sheets-Sheet 1
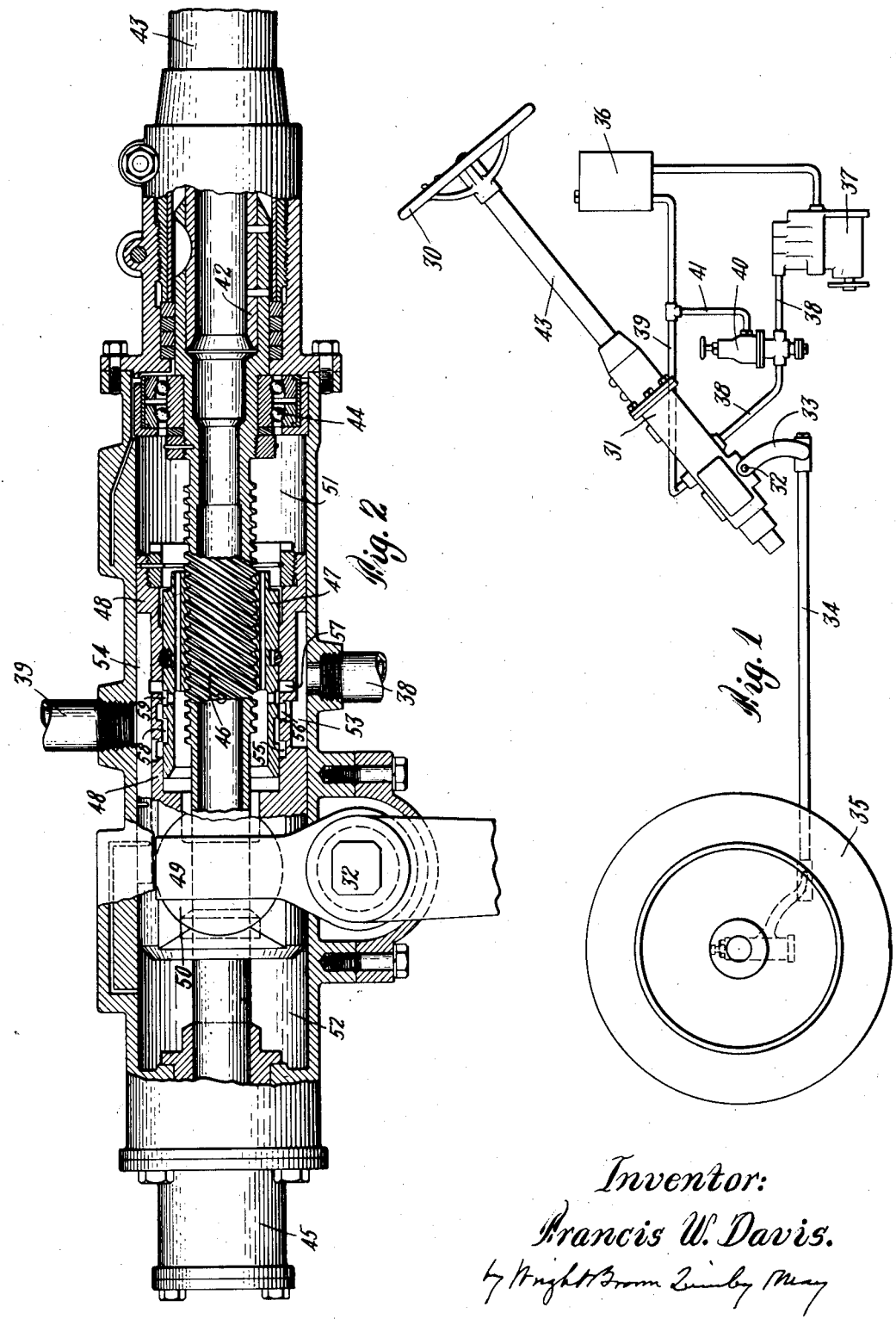
Inventor:
Francis W. Davis.
by Wright Brown Quinby May
Att'ys.

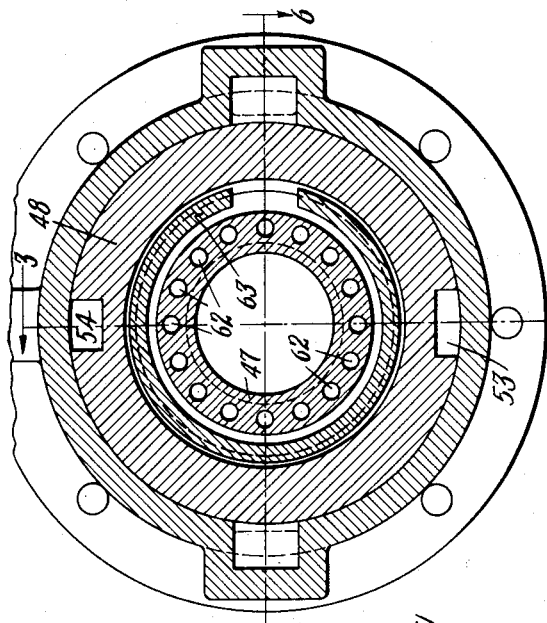
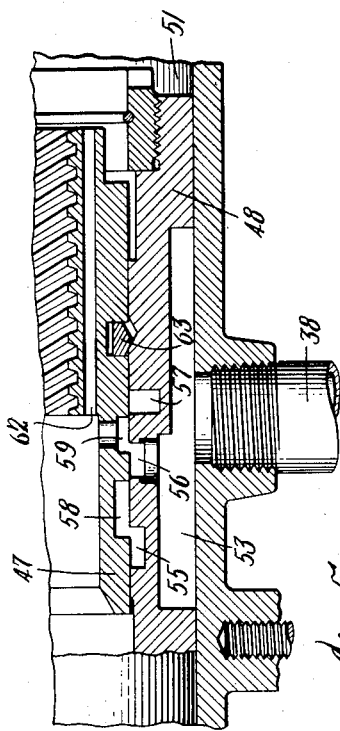
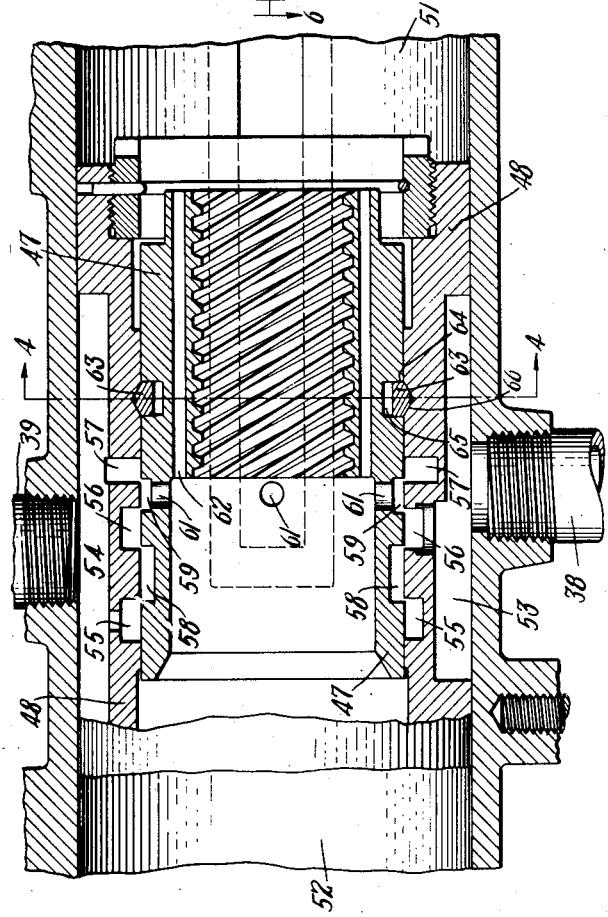

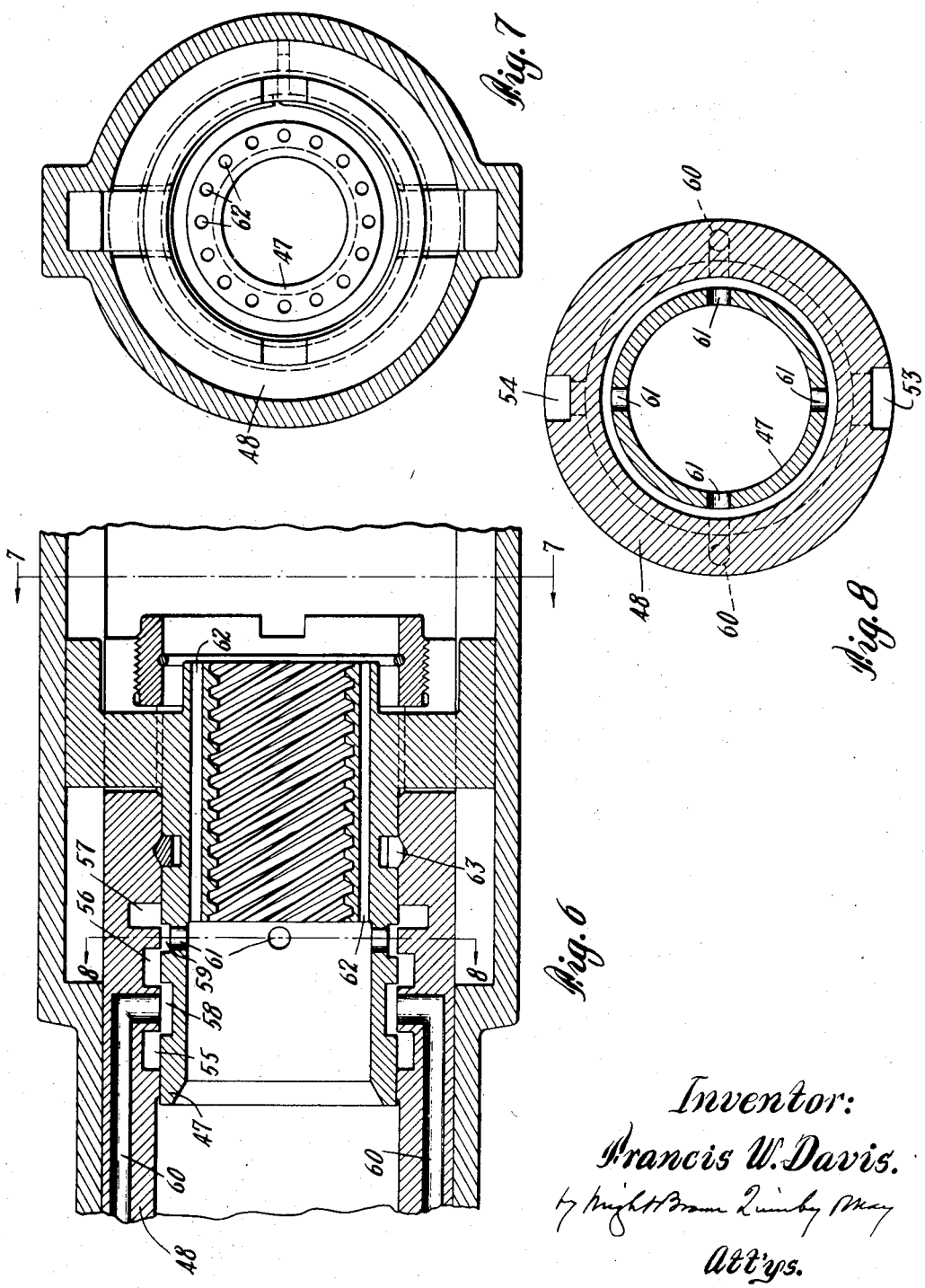

Nov. 28, 1933.  F. W. DAVIS  1,937,470
POWER STEERING MECHANISM
Filed Oct. 24, 1928   7 Sheets-Sheet 4
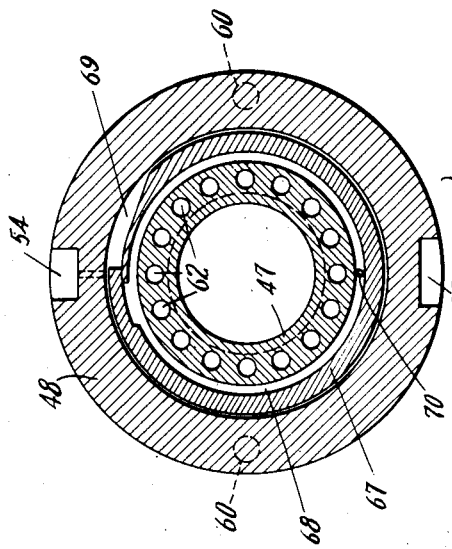
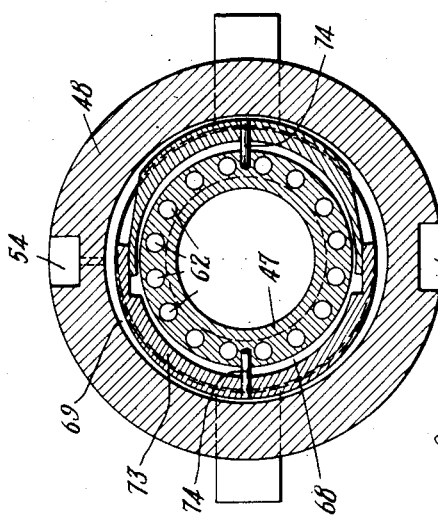
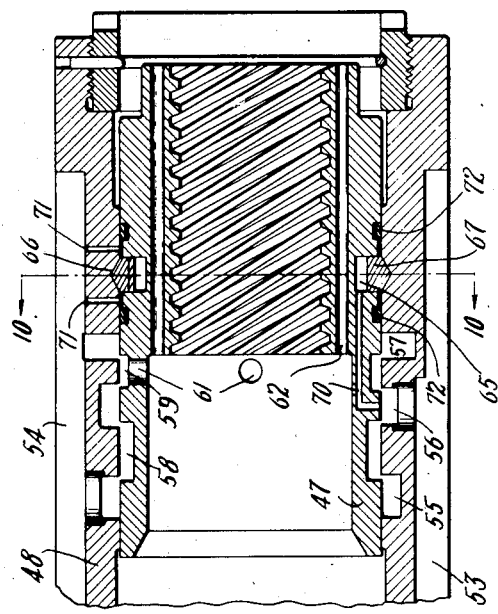
Inventor:
Francis W. Davis.
by
Att'ys.

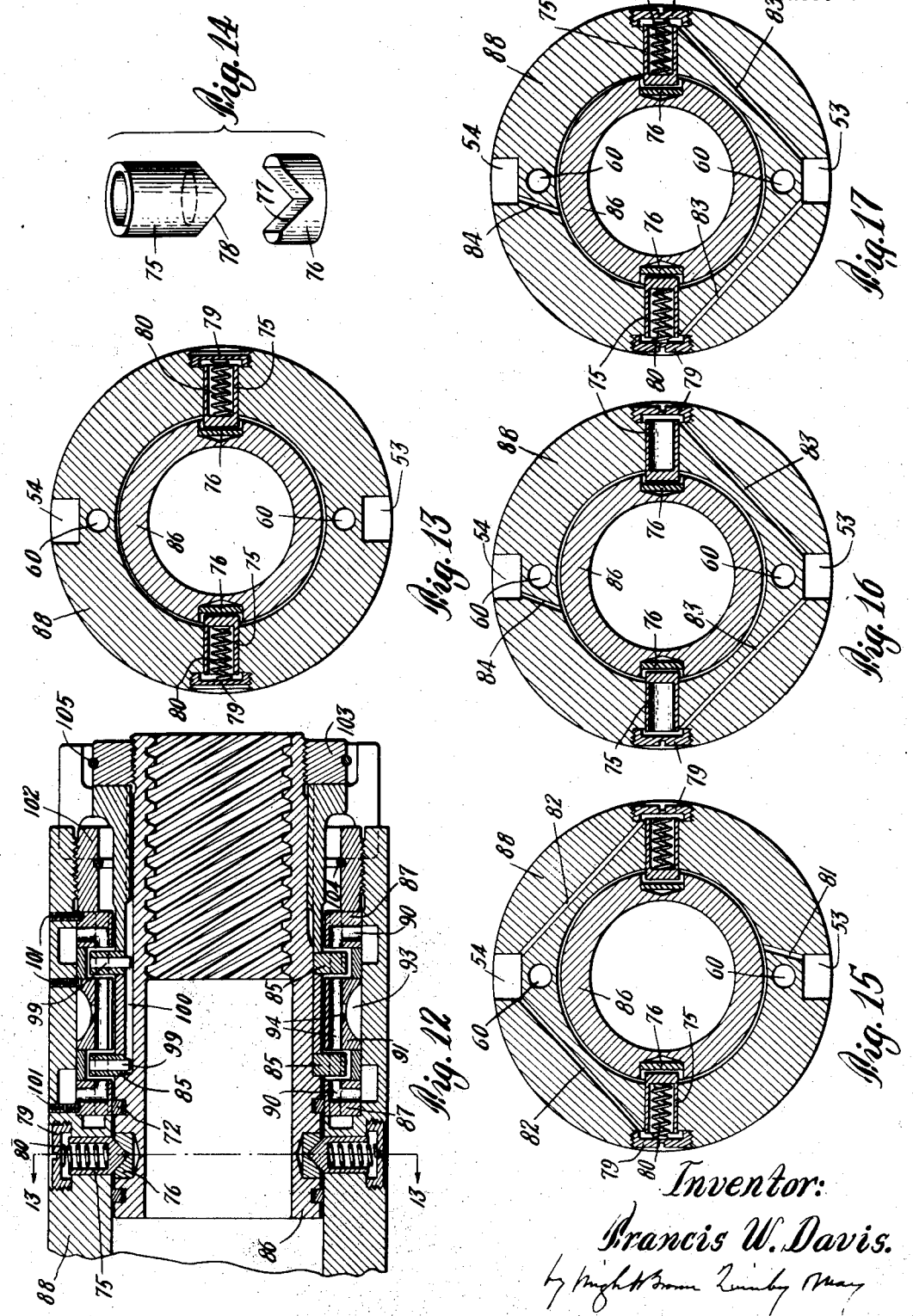

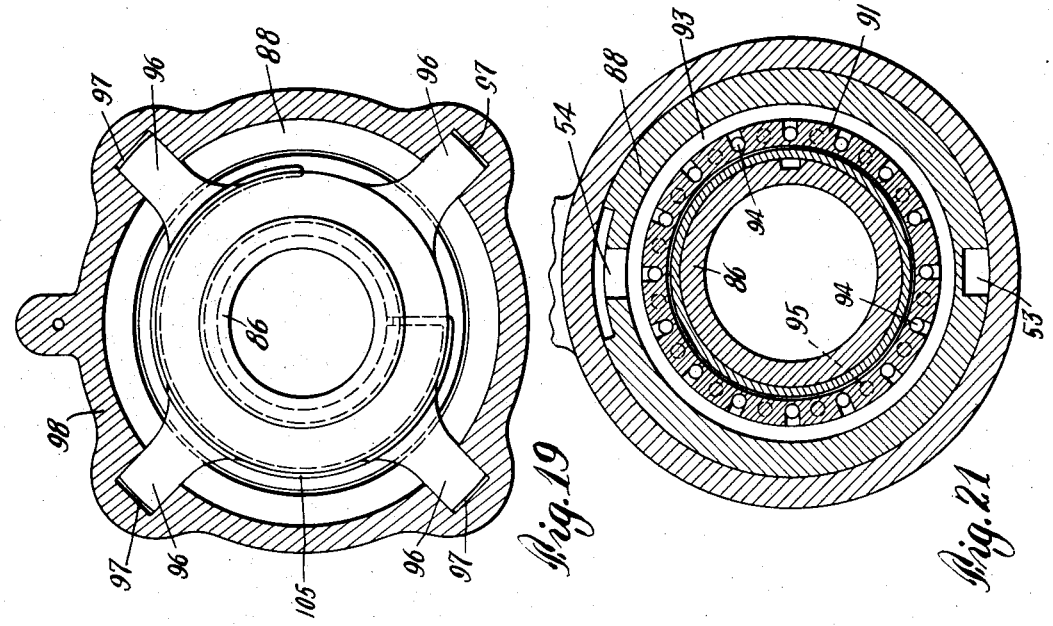
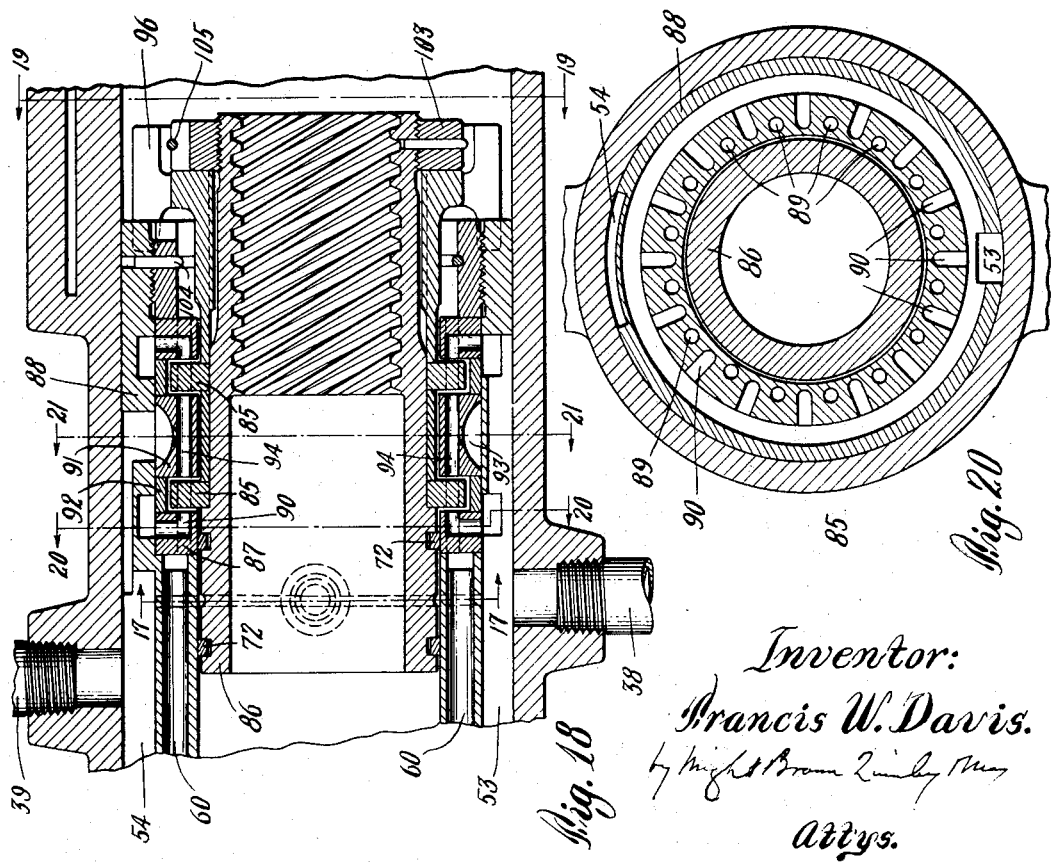

Nov. 28, 1933.    F. W. DAVIS    1,937,470
POWER STEERING MECHANISM
Filed Oct. 24, 1928    7 Sheets-Sheet 7
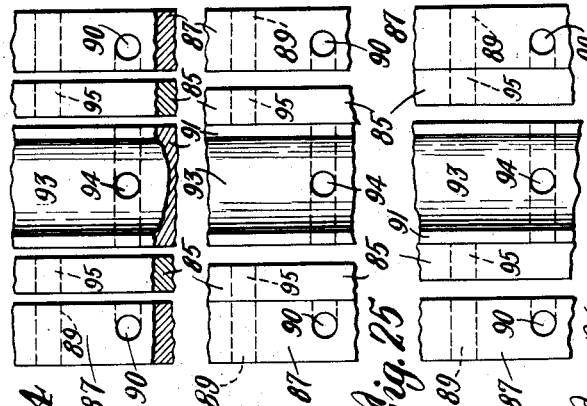
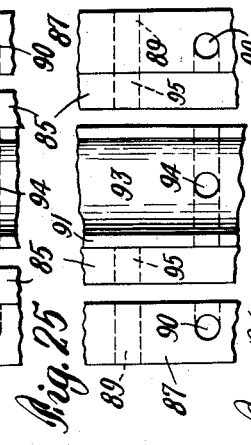
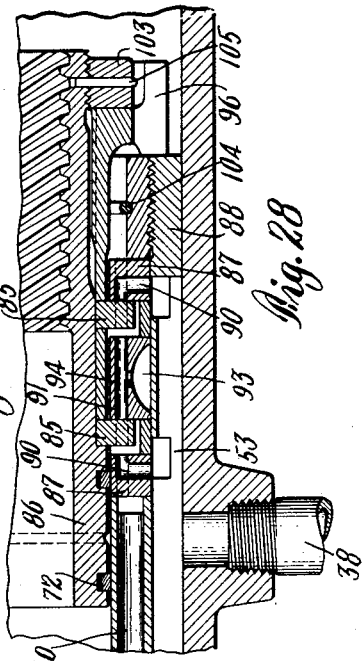
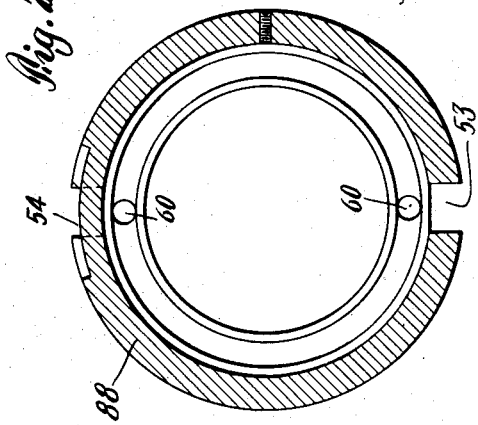
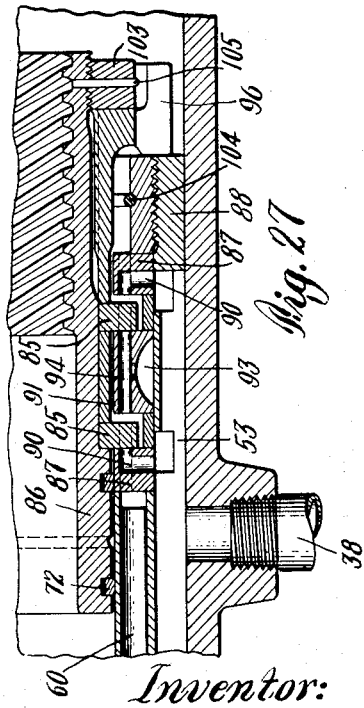
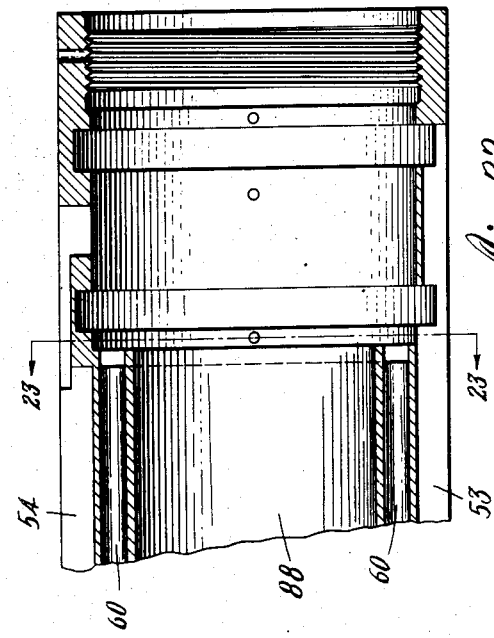
Inventor:
Francis W. Davis.
Att'ys.

Patented Nov. 28, 1933

1,937,470

UNITED STATES PATENT OFFICE 1,937,470

POWER STEERING MECHANISM

Francis W. Davis, Waltham, Mass.

Application October 24, 1928. Serial No. 314,702

14 Claims. (Cl. 121—41)

This invention relates to improvements in power steering mechanism, such as is described in my application Serial No. 190,526 filed May 11, 1927, pursuant to which Patent No. 1,790,620 was granted January 27, 1931, by which mechanism power is constantly and instantly available during the operation of the mechanism to follow the motion of the steering wheel and to deflect the vehicle wheels accordingly. In case of failure of the power supply, the mechanism functions like an ordinary hand steering gear.

Steering systems of the type described in my aforementioned application Serial No. 190,526, and hereinafter, include means for circulating power fluid such as oil, glycerine or the like through a series of elements including a reservoir, a power pump which draws the fluid from the reservoir, and a power cylinder to which fluid is delivered by the pump to actuate the steering mechanism. The power fluid from the steering mechanism is preferably returned to the reservoir for recirculation. The steering mechanisms hereinafter described are preferably of the "open valve" type, that is, so constructed that when the mechanism is idle, there is a free passage therethrough for the power fluid, so that the pump works under only a sufficient load to overcome the fluid friction of the power fluid in the pipes and passages through which it circulates. Thus practically all the energy output of the pump is converted into the useful work of steering when steering is being done instead of being wasted in overcoming back pressure set up by a relief valve when the steering mechanism is idle. In the mechanism described in my aforementioned application a sensitive follow-up motion is effected between a sliding element movable by turning the steering wheel, and a second sliding element mechanically connected to the steered part of the vehicle. These two sliding elements have a normal or "neutral" relative position and when they are in this position, no fluid power is exerted on the steered part. When, however, either element is moved so that the two are not in their "neutral" relative position, the mechanism is so constructed that the pressure will be built up in the power fluid and exerted on one of the sliding elements to restore it to neutral position relative to the other element. An object of the present invention is to provide improved means for controlling and directing the power fluid in effecting this follow-up motion.

It is desirable that in addition to the power-actuated follow-up motion of the elements, other means be provided which tend to maintain the slidable elements in their neutral relative position or to restore them to neutral position when displaced therefrom. It is an object of this invention to provide improved means for this purpose, such means being adapted to produce different steering effects according to their arrangement and adjustment as will be hereinafter described in detail.

For a more complete disclosure of the invention reference is had to the description thereof which follows, and to the drawings, of which,—

Figure 1 is a diagramatic representation of a complete steering gear embodying the invention as applied to an automobile.

Figure 2 is an elevation of the control mechanism, a portion being broken away to show the working parts in section.

Figure 3 is a fragmentary section of a portion of the mechanism shown in Figure 2, this section being taken on the line 3—3 of Figure 4.

Figure 4 is a transverse section taken on the line 4—4 of Figure 3.

Figure 5 is a fragmentary section similar to a portion of Figure 3, showing the parts in a different position of operation.

Figure 6 is a section on the line 6—6 of Figure 4.

Figure 7 is a section on the line 7—7 of Figure 6.

Figure 8 is a section on the line 8—8 of Figure 6.

Figure 9 is a fragmentary longitudinal section of a portion of the mechanism shown in Figure 3, this figure showing a modified form of construction.

Figure 10 is a section on the line 10—10 of Figure 9.

Figure 11 is a section illustrating a further modification of the invention, this section being taken on a line similar to the line 10—10 of Figure 9 but in the opposite direction.

Figure 12 is a fragmentary longitudinal section of steering mechanism of a modified form.

Figure 13 is a section on the line 13—13 of Figure 12.

Figure 14 is a perspective view of a pair of elements shown in Figure 12.

Figures 15, 16 and 17 are sections similar to Figure 13 but illustrating various modifications of structure, Figure 17 being taken on the line 17—17 of Figure 18.

Figure 18 is a longitudinal section of steering apparatus similar to that shown in Figure 12, the plane of section being at right angles to the plane of section of Figure 12.

Figure 19 is a section on the line 19—19 of Figure 18.

Figure 20 is a section on the line 20—20 of Figure 18.

Figure 21 is a section on the line 21—21 of Figure 18.

Figure 22 is a fragmentary section of one of the members shown in Figure 18.

Figure 23 is a section on line 23—23 of Figure 22.

Figures 24, 25 and 26 show in fragmentary elevation some of the valve members in different positions of operation to illustrate the operation of the valve of the power mechanism shown in Figure 18.

Figures 27 and 28 are fragmentary sections of a portion of Figure 18 showing the parts in positions of operation corresponding respectively to Figures 25 and 26.

Referring to the drawings in detail, 30 represents a steering wheel of an automobile which is connected by suitable mechanism 31 to a cross shaft 32 on which is mounted a crank arm 33 connected to a drag link 34 through which the steered vehicle wheels 35 are deflected in order to guide the vehicle. The connecting mechanism 31 is, according to the invention, operated by hand or by power fluid, or both, according to circumstances. This fluid may be circulated through a supply reservoir 36 by means of a suitable pump 37 which may be attached to the cam shaft of the vehicle motor or driven in any other suitable manner. The pump 37 supplies fluid through a pipe 38 to the mechanism 31, an exhaust pipe 39 leading from the mechanism back to the reservoir 36. In order to prevent possible damage to the mechanism arising from accidental excessive pressure, I may provide a by-pass valve 40 which is adapted to relieve excess pressure in the supply pipe 38 and allow the fluid to return to the reservoir 36 through a by-pass 41. The mechanism 31 for employing the power fluid to assist in deflecting the vehicle wheels 35 may be similar to that illustrated in Figure 2. As therein shown, this mechanism comprises a steering post 42 which is rigidly connected to the steering wheel 30 so as to rotate therewith, this steering post being preferably housed within a steering column 43. The lower portion of the steering post may be mounted to rotate in suitable ball bearings 44 and 45, a portion of the post being threaded as at 46 for engagement with a suitable cylindrical nut 47 which is slidably mounted in a cylindrical piston 48. The piston 48 is mechanically connected to the cross shaft 32 by any suitable linkage. As shown in Figure 2, by way of example, a pair of fingers 49 may be secured to the shaft 32 and may be slidably fitted into a pair of cylindrical blocks 50 which are transversely channeled to receive the fingers 49. The blocks 50 are, in turn, fitted into cylindrical recesses in the sides of the piston 48. Thus reciprocation of the piston results in rocking the cross shaft 32.

In order to utilize the power fluid which is supplied through the pipe 38, this fluid is introduced into one or the other of a pair of chambers 51, 52 enclosed by the casing in which the piston 48 slides at either end of the piston. In order to control the flow of the power fluid I may form the nut 47 on the piston 48 with a number of ports or passages through which the power fluid may flow. I may utilize any convenient fluid for the operation of this mechanism, but prefer an incompressible fluid such as oil, glycerine or other liquid. For convenience the power fluid will hereinafter be referred to as oil, though it is to be understood that the invention is not limited to the use of any particular fluid.

The steering mechanism illustrated in Figure 2 is described and illustrated fully, except for the specific centering means herein employed, in my co-pending application Serial No. 190,526, filed May 11, 1927. This construction includes a longitudinal channel 53 cut into the outer surface of the piston 48 and so situated as to communicate with the supply pipe 38 for all positions of the piston 48. On the opposite side of the piston another longitudinal channel 54 is cut, this channel being always in communication with the exhaust pipe 39. In the inner wall of the piston 48 are formed three circular channels 55, 56, 57, the channel 56 opening into the supply channel 53 and the channels 55 and 57 opening into the exhaust groove 54. In the outer wall of the nut 47 are formed a pair of circumferential channels 58, 59, these channels being so related to the channels 55, 56, 57 that when the nut and piston are in their normal inoperative position, which is hereinafter referred to as their "neutral" position, as shown in Figure 2, the channels 58, 59 will communicate with the supply groove 53 and with the exhaust groove 54. The mode of operation of this steering mechanism is more clearly illustrated in Figures 3 and 5, Figure 3 showing the nut and piston in their neutral position. The channel 58 is constantly in communication with a pair of passages 60 (Figure 6) which lead to the chamber 52. The channel 59 is connected with the chamber 51 by a series of openings 61 and passages 62 so that it is obvious that if the pressure of the oil in the channel 58 exceeds that in the channel 59, then the fluid will exert a greater pressure in the chamber 52 than it will in the chamber 51 and hence will tend to move the piston 48 toward the right. Conversely, if the pressure in the channel 59 exceeds that in the channel 58, then the fluid will tend to push the piston 48 toward the left. The pressure conditions in the channels 58 and 59 are controlled by the relative positions of the nut 47 and the piston 48. If the nut, for example, is moved with respect to the piston, the openings between the channel 56 and the channels 58 and 59, which are substantially equal when the nut and piston are in their neutral position, will become unequal, the limiting situation being that shown in Figure 5 where one of these openings is completely closed and the other is fully open. In this case the full pressure of the fluid supply through the pipe 38 and the channel 56 is directed into the channel 59 and thence into the chamber 51, the channel 58 being entirely cut off from the oil supply. At the same time the connection between the channel 58 and the exhaust channel 55 is increased, thus permitting a quick discharge of oil from the chamber 52. Between the neutral position of the piston and nut and their extreme relative positions in either direction the power applied for steering the vehicle varies with the amount of relative displacement of the piston and nut from their neutral position. The slightest relative displacement of the piston and nut from their neutral position results in an unbalancing of the flow through the branch passages in the cylinder, and hence in the application of unequal pressures on the ends of the piston. By reason of this construction the apparatus is extremely sensitive.

In order to build up pressure in the chamber 51 the opening between the chamber 59 and the exhaust channel 57 is closed simultaneously with the opening between the channel 59 and the supply channel 56. Thus when the nut 47 is moved toward the left, as illustrated in Figure 5, oil pressure is introduced into the chamber 51 in excess of the pressure in chamber 52 so that this pressure of the oil against the end of the piston tends to push the piston toward the left to follow the motion of the nut. It is obvious that as soon as the piston is moved sufficiently to catch up with the nut 47 and thus to restore their mutual neutral position, the parts will then be as shown in Figure 3 with equalized oil pressure in the two pressure chambers. Conversely if the nut is moved toward the right the supply of oil to the chamber 51 will be diminished or cut off entirely, the oil being directed to the chamber 52 from which the exhaust port is diminished or closed.

A power steering mechanism constructed as thus far described is practically irreversible, that is, any deflecting force impressed on the vehicle wheels will be resisted by the power mechanism so that no resulting impulse will be felt at the steering wheel 30. This arises from the fact that if a rut or obstruction deflects the vehicle wheels 35, this results in a movement of the piston 48 relative to the nut 47, thus altering the supply and exhaust ports as hereinbefore described so as to bring oil pressure to bear on the piston in a direction to push it back to its former neutral position relative to the nut. As this action is entirely automatic no impulse is felt on the steering wheel 30. This entire absence of "feel" in steering an automobile may be somewhat objectionable since it is ordinarily desirable for the operator to guide the vehicle to some extent by the "feel" of deflecting forces acting on the vehicle wheels which are transmitted through the steering mechanism to the steering wheel 30. In order to provide a limited amount of reversibility to the mechanism, I may provide, according to the present invention, improved centering means, which may be independent of the power actuation of the piston, for resiliently maintaining the nut and piston in their neutral position or for restoring the nut and piston to their neutral position when moved therefrom. This centering mechanism is of value not only in its effect of producing "feel" on the steering wheel, but also for preventing unnecessary strain on the apparatus in certain circumstances. If, for example, while the pump 37 is operating and the vehicle is at rest the steering wheel 30 should be accidentally turned after the vehicle wheels have reached their limit of deflection, the result would be to leave the apparatus in the condition illustrated in Figure 5 where the full pressure of the oil would be exerted on one end of the piston. If, however, there is a restoring device, as soon as the steering wheel 30 is let go under such circumstances the nut and piston will be restored to their neutral position, thus relieving the piston of unbalanced oil pressure in the chambers 51 and 52.

Figures 3 and 4 illustrates an embodiment of the present invention, this embodiment comprising a ring 63 which is preferably made of spring metal. As shown this ring may have end faces 64 in planes perpendicular to the axis of the piston. This portion of the ring is preferably fitted into a rectangular channel 65 which, as shown, may be cut in the outer surface of the nut 47. The outer peripheral surface of the ring 63 may be formed with a pair of opposed frusto-conical faces adapted to fit into a V-shaped groove 66 cut in the inner wall of the piston 48 and adapted to register accurately with the channel 65 when the piston and nut are in their neutral position. The ring 63 is so shaped as to spring outwardly so as to press the peripheral faces thereof against the sides of the groove 66. It is obvious that relative motion of the nut and piston will cause one of the peripheral faces of the ring 63 to ride on the corresponding side of the groove 66 in such a way as to press the ring inwardly against the resilient force of its spring. The outward pressure of the ring 63 against the side wall of the groove 66 results in a camming action between the contacting force of the ring and the side of the groove which tends to move the piston and nut back to their neutral position. By selecting suitable material for the ring 63 and shaping it so that it undergoes a desired amount of deformation in order to conform to the groove 66, the magnitude of the restoring force exerted by the ring 63 can be regulated, thus regulating the amount of reversibility of the gear and hence the "feel" of the steering action on the steering wheel 30. While I have illustrated the V groove 66 as being formed in the inner wall of the piston and the rectangular channel 65 as being formed in the wall of the nut, it is obvious that I may exchange the positions of these channels and use a ring 63 which is formed to spring inwardly. There are also many other similar equivalents of structure which come within the scope of the invention.

A modified embodiment of the invention is illustrated in Figures 9 and 10, wherein is shown a ring 67 having preferably a cross section similar to the ring 63 but having overlapping ends forming substantially fluid-tight partitions between the space 68 within the channel 65 and the space 69 within the groove 66. The space or chamber 68 within the groove 65 may be connected, as by a suitable passage 70, to the supply channel 56 so that pressure conditions in the supply channel will be transmitted to the chamber 68. The chamber 69 between the groove 66 and the ring 67 may be connected, as by suitable passages 71, to the exhaust channel 54. Thus the action of the spring, due to its resilience, may be modified by variations of pressure in the supply port 56. For example, if the nut 47 is moved with relation to the piston 48, this results in an immediate building up of oil pressure in the port 56, this pressure being transmitted to the chamber 51 or 52 according to the direction of motion of the nut. This built-up pressure is likewise transmitted through the passage 70 to the chamber 65 thus pressing the inner surface of the ring 67 and augmenting its radial outward thrust so that the oil pressure assists the ring in its action of restoring the nut and piston to their neutral position. In order to minimize leakage from the chambers 68 and 69, I may provide suitable piston rings 72 on the wall of the piston 48 as shown in Figure 9.

Figure 11 illustrates a further modification of nut centering means, the ring 67 being replaced in this case by a two part ring 73, the two parts of this ring having overlapping, telescoping end portions arranged to slide on one another in such a way as to maintain a substantially fluid-tight partition between the chamber 68 in the channel 65 and the chamber 69 in the groove 66. The parts of the ring 73 are preferably substantially rigid and non-resilient. The chambers 68 and 69, as shown in Figures 9 and 10, may be connected respectively with the supply port 56 or the exhaust channel 54 so that the restoring action of the ring 73 in this embodiment of the invention depends entirely upon the application of oil pressure from the supply port 56, the action of the ring 73 being identical with the action of the ring 67 except that the ring 73 acts by fluid pressure alone unaided by outward spring pressure. In order to keep the two parts of the ring 73 properly alined, I may provide each with a pin 74 extending radially into suitable holes in the wall of the nut 47.

Figure 12 illustrates a further modification of the invention, this modification being shown in connection with a slightly different form of steering mechanism which, however, acts in substantially the same manner as that illustrated in Figure 2. The centering devices illustrated in Figures 12 to 17 may be employed with the form of steering mechanism illustrated in Figure 2 as well as that shown in Figures 12 and 18. The form of centering device shown in Figures 12 and 13 may comprise one or more cylindrical plungers 75 which are preferably hollow for the greater part of their length, as shown in Figure 14, one end being open and the other end having a wedge shape. To cooperate with each plunger 75 I may provide a button 76 having a V-shaped opening 77 shaped to fit with the wedge end 78 of the plunger.

As shown in Figures 12 and 13 the buttons 76 may be set into suitable recesses formed in the outer face of the nut 86, the buttons preferably being forced in for a driving fit. The buttons are preferably arranged so that the bottom of the V-groove 77 is disposed in a tangential direction with reference to the nut 86. The plunger 75 is inserted in a suitable bore extending through the wall of the piston 88, the plunger being retained therein as by a suitable cap screw 79. Within the hollow of the plunger 75 I may insert a compression spring 80, one end of which bears against the inner face of the cap 79, this spring acting to press the wedge end 78 of the plunger 75 into the notch 77. The cap screw 79 may be utilized to vary to some extent the normal compression of the spring 80. It is obvious from Figure 12 that if the nut 86 is moved axially with respect to the piston 88, one of the faces of the wedge 78 will slide on the corresponding side of the notch 77 thus forcing the plunger 75 radially outward against the compression of the spring 80. Thus the pressure of the spring tends to restore the nut and piston to their mutual positions.

According to the embodiment of the invention illustrated in Figure 15 the action of the springs 80 may be diminished by oil pressure conditions in the supply channel 53. As shown in this figure the supply channel 53 is connected, as by a passage 81, to the clearance space between the nut and piston adjacent to the wedge end of the plunger 75. The hollow end of the cap screw 79 is likewise connected, as by a passage 82, to the exhaust channel 54 so that when the nut is moved relatively to the piston, thus causing an increase of pressure in the supply channel 53, this pressure is brought to bear against the wedge end of the plunger 75, thus opposing to some extent the inward thrust of the spring 80. This affects the characteristics of the "feel" of the steering wheel 30.

In the embodiment of the invention shown in Figure 16 the springs 80 are dispensed with entirely. The space under the cap screw 79 is connected, as by a passage 83, to the supply channel 53, the space adjacent to the wedge end of the plunger 75 being connected, as by a channel 84, to the exhaust channel 54. Thus when the nut is moved from its neutral position relative to the piston, pressure in the channel 53 acts on the plungers 75 to push them inwardly, thus tending to restore the nut and piston to their neutral position. In this form of the invention the restoring force is thus proportional to the pressure built up in the supply channel 53.

In the structure shown in Figure 17 the spaces at either end of the plunger 75 are connected by passages 83, 84 in the same manner as shown in Figure 16. In this embodiment of the invention, however, I also employ a spring 80 for each plunger 75 the action of which spring is augmented by pressure conditions in the supply channel 53 instead of being opposed by such pressure conditions as in the form illustrated in Figure 15.

The modified form of steering mechanism illustrated in Figures 12 and 18 to 28 comprises a pair of perforated rings 85 fixed on or formed integrally with the nut 86. The rings 85 are each provided with a circular series of perforations extending therethrough at points adjacent to their peripheries in a direction parallel to the axis. These rings cooperate with a pair of rings 87 fixed within the piston 88, the rings 87 each having a series of perforations 89 extending therethrough in a direction parallel to the axis, these being alternated with L-shaped passages 90 which are illustrated in Figures 12 and 18. Between the rings 85 another ring 91 is secured to the piston 88, the rings 87 being disposed opposite to the remote faces of the rings 85. The rings 87 and 91 are suitably spaced as by elements 92 which permit sufficient clearance between the opposed faces of the rings 85, 87 and 91. The ring 91 has a peripheral channel 93 which communicates with the exhaust passage 54 and also with a circular series of perforations 94 which extend through the ring in a direction parallel to the axis. The action of the rings 85, 87 and 91 in controlling the oil flow is clearly illustrated in Figures 24 to 26. When the piston and nut are in their neutral position, the rings 85 are evenly spaced from the rings 87 and 91 as shown in Figure 24. The L-shaped passages 90 in the rings 87 are at all times in communication with the supply channel 53, the ports 94 in the ring 91 being at all times in communication with the exhaust channel 54. Each of the perforations 95 in the rings 85 registers with a perforation 89 in the adjacent ring 87. Each of the perforations 94 of the ring 91 is opposite an L-shaped passage 90 in each of the rings 87 but is separated therefrom by the rings 85. When the piston and nut are in neutral position, as shown in Figure 24, oil will flow in through all the passages 90 and will flow around the rim of the rings 85 and into the perforations 94, thence passing out through the exhaust channel 54. If now the nut 86 with its rings 85 is moved toward the left, as in Figure 25, the passages 90 of the left hand ring 87 are shut off so that the oil supply is cut off from the chamber at the left hand end of the piston, the registering perforations 89 and 95, however, permitting the escape of oil therefrom. At the same time the right hand ring 85 moves against the ring 91 closing the perforations 95 in the right hand ring 85 and thus preventing the escape of oil in the right hand chamber outwardly through the perforations 94. The inflow of oil through the channels 90 in the right hand ring 87 thus builds up pressure on the right hand end of the piston tending to push the piston toward the left to follow the initial motion of the nut to the left. Conversely, movement of the nut with its rings 85 toward the right as in Figure 26 causes oil pressure to build up against the left hand end of the piston, thus tending to push it toward the right to follow the motion of the nut. The nut may be provided, as shown, with a number of outwardly extending lugs or fins 96 which are fitted to slide in suitable channels 97 formed in the casing 98 which contains the mechanism. These lugs 96 take the rotational thrust of the nut 86 caused by the turning of the steering post which is in threaded engagement therewith so that rotation of the nut relative to the casing 98 is effectively prevented. Since no torque is impressed on the piston in the operation of the mechanism, it is readily prevented from "working" rotationally by its mechanical connections with the cross shaft, as shown in Figure 2, so that the piston and the nut are both held against rotation relative to the cylinder casing, and hence relative to each other.

In order to maintain accurate registration of the corresponding perforations in the rings 85, 87 and 91, the rings 85 may be keyed to the nut 86, as by pins 99 shown in Figure 12, these pins sliding into a channel 100 when the rings 85 and their spacing elements are assembled on the nut 86. Suitable set screws 101 may be provided in the piston to prevent the rings 87 and 91 from working around so as to get out of alinement with the rings 85. In order to hold the rings 87 and 91 and their spacing elements securely in place within the piston, I may provide an internal nut 102 which is in threaded engagement with the under portion of the piston, and which bears against one of the rings 87, as shown in Figures 12 and 18. The rings 85 and their spacing elements may be secured in position on the nut, as by a ring nut 103, the ring nuts 102, 103 being preferably locked in position by springs 104, 105.

Having thus described one embodiment of this invention, it should be evident that many changes and modifications might be made therein without departing from its spirit or scope as defined by the appended claims.

I claim:

1. In a follow-up mechanism including two relatively movable members, one of said members having a pair of opposed inclined faces, stops for definitely limiting relative movement between said members, means for restoring said members to a predetermined intermediate relative position whenever moved therefrom in either direction, said means comprising an element having inclined faces normally pressing on the inclined faces of said one member, said element being engaged by the other said member to move therewith relative to said one member, whereby said element slides on one or the other of said inclined faces when said members move from said predetermined position, said inclined faces having sufficient width for engagement with each other for all relative positions of the members within the limits set by said stops.

2. In a follow-up mechanism having a pair of nested cylindrical members relatively slidable one within the other for a limited axial distance in either direction from a normal relative position, limit stops for definitely limiting the extent of relative movement of said members from their normal position, and means for restoring said members to said normal position whenever moved therefrom to any position within the limits of their permitted relative movement, said means comprising an element set into said members, one of said members being provided with means for holding said element axially immovable relatively thereto, interengageable cam faces on said element and the other said member of sufficient size and extent to be in operative restoring engagement for all relative positions of said members within the limits set by said limit stops, said mechanism including means for pressing a cam face of said element against a cam face of said other members when said members are moved from their normal relative position.

3. In a follow-up mechanism having a pair of nested cylindrical members relatively slidable one on the other for a limited axial distance in either direction from a normal relative position, means for resiliently maintaining said cylindrical members in said normal relative position, and means comprising an element retained against axial movement relative to one of said members, said element and the other said member having interengaging cam faces resiliently pressed together, said cam faces being so disposed as to tend to restore the members to said normal relative position when either said member is displaced therefrom, said mechanism including limit stops for positively limiting the relative movement between said members within the range of restoring action of said cam faces.

4. In a follow-up mechanism, a pair of nested cylindrical members relatively slidable one on the other for a limited axial distance, means for preventing relative rotation between said members, and means tending to restore said members to normal relative position whenever displaced therefrom to any other position within the limits of their relative movement, said restoring means comprising an element retained against axial movement relative to one of said members, said element and said other member having interengaging cam faces arranged at an angle to the direction of axial movement, said mechanism including limit stops for positively limiting the relative movement between said members within the range of restoring action of said cam faces.

5. In a follow-up mechanism, a pair of nested cylindrical members relatively slidable one on the other for a limited axial distance, the inner of said members having a circumferential groove in its outer face, the outer of said members having a circumferential groove in its inner face registering with the first-mentioned groove when said members are in their normal relative position, and means for resiliently restoring said members to said normal relative position whenever displaced therefrom to any other position within their limits of relative movement, said means comprising an expansible and contractile ring in said grooves having end faces in radial planes and a peripheral surface comprising a pair of opposed frusto-conical faces, one of said grooves having side walls in radial planes to engage the end faces of said ring and to retain said ring against axial movement relative to the said member thus grooved, the other said groove having a V-shape with frusto-conical faces normally engaging the peripheral surface of said ring, said mechanism including means for resiliently pressing said peripheral surface of the ring into said V-groove.

6. In a power steering gear, a follow-up mechanism including a pair of nested cylindrical members relatively slidable one on the other for a limited axial distance in either direction from a normal relative position, said members having circular grooves in their contacting faces registering when in said normal relative position to form an annular hollow, one of said grooves having a rectangular cross-section, the other groove having a V cross-section, and means for resiliently restoring said members to said normal relative position whenever displaced therefrom to any other position within their range of relative movement, said restoring means comprising a spring ring within said hollow having end faces engaging the side faces of said rectangular groove and peripheral faces spring-pressed into engagement with the sides of said V-groove.

7. In a power steering gear, a follow-up mechanism including a pair of nested cylindrical members relatively slidable one on the other for a limited axial distance from a normal relative position, the inner of said members having a circumferential channel of rectangular cross-section in its outer face, the outer of said members having a V-groove in its inner face registering with said channel when said members are in their normal relative position to form an annular hollow, and means for restoring said members to their normal relative position whenever displaced therefrom to any other position within their limits of relative movement, said means comprising an expansible and contractile ring within said hollow having peripheral faces normally pressed against the sides of the V-groove, a portion of said ring being within said channel to prevent relative axial movement between the ring and the inner of said members.

8. In a power fluid actuated follow-up mechanism, two members having surfaces in mutual sliding contact for a limited distance in either direction from a neutral relative position, one of said members having opposed inclined faces, means for restoring said members to their neutral relative position when moved therefrom to any other position within their range of relative movement, said means comprising an element having inclined faces spring-pressed against the inclined faces of said one member, said element being carried by said other member, and means for exerting power fluid pressure on said element to augment the pressure of its inclined faces against the inclined faces of said one member when said members move from their neutral relative position, whereby to restore said members to their neutral position.

9. In a power fluid actuated follow-up mechanism, two members having surfaces in mutual sliding contact for a limited distance in either direction from a neutral relative position, one of said members having a pair of opposed inclined faces, means for restoring said members to said neutral relative position when moved therefrom to any other position within their range of relative movement, said means comprising an element having inclined faces normally bearing on the inclined faces of said one member, said element being carried by said other member, and means for exerting power fluid pressure on said element when said members are moved from their neutral relative position, whereby to restore said members to their neutral position.

10. In a follow-up mechanism, two members relatively movable a limited distance in either direction from a predetermined relative position, means for restoring said members to said predetermined relative posititon whenever moved therefrom in either direction, said restoring means including means for exerting pressure at an angle to the direction of said relative motion, and means for converting said pressure into pressure against one of said members having a component in the direction of said relative motion, said mechanism including limit stops for positively limiting the relative movement between said members within the range of restoring action of said restoring means.

11. In a liquid actuating device for steering gear and similar apparatus, the combination of a piston and cylinder, valve mechanism including a movable valve and a seat having cooperating ports, said seat having passageways connecting same to the cylinder, said movable valve being normally held in central position relative to its seat for admitting liquid under pressure to both sides of said piston and movable from its central position to admit liquid to one side or the other side of said piston and exhausting the liquid from the contrary side to cause a relative movement between the piston and cylinder, means to be actuated connected to the movable element of said piston and cylinder construction, the liquid constantly under pressure on both sides of the piston controlling at all times the relative position of the means to be actuated, a main control member connected to directly operate said movable valve, the valve seat being rigidly connected to said movable element whereby actuation of either the control member or the movable element will cause relative movement of the two valve parts, and a positive acting centralizing device for said movable valve and seat comprising a connection rigidly connected to one of said valve parts and having a depression formed in it, and a spring detent device formed in a member rigidly secured to the other part of said valve, said depression and spring detent being so arranged as to solidly contact when said valve parts are in central pressure-equalizing position.

12. In combination with a fluid power follow-up mechanism consisting of a fluid motor having a movable driven member, means for directing pressure fluid to move said driven member, a hand-operable member movable with said driven member and also capable of limited movement relative thereto from an intermediate neutral position, and valve means controlled by said relative movement for directing fluid under pressure to move said driven member, spring means to restore said members to their neutral relative position when displaced therefrom, and means for directing pressure fluid to augment the restoring force of said spring means by an additional force proportional to the pressure of the fluid supplied.

13. In combination with a fluid power follow-up mechanism consisting of a fluid motor having a movable driven member, means for directing pressure fluid against said driven member to cause movement thereof, a hand-operable valve member movable with said driven member and also capable of limited movement relative thereto from an intermediate neutral position, and valve means controlled by said relative movement for directing fluid under pressure against said driven member, cam means actuable to restore said members to their neutral relative position when displaced therefrom, spring means for actuating said actuable means, and means for directing pressure fluid to actuate said actuable means in conjunction with said spring.

14. In combination with a fluid power follow-up mechanism consisting of a fluid motor having a movable driven member, means for directing pressure fluid against said driven member to cause movement thereof, a hand-operable valve member movable with said driven member and also capable of limited movement relative thereto from an intermediate neutral position, and valve means controlled by said relative movement for directing fluid under pressure against said driven member, means for restoring said members to neutral relative position when displaced therefrom, said restoring means including a cam element carried by one member and having cam faces engaged by the other member, spring means pressing said cam faces against said other member, and means for directing pressure fluid against said cam element to augment the force of the spring by a force proportional to the pressure of the fluid supplied to the mechanism.

FRANCIS W. DAVIS.